(12) United States Patent
Guenter et al.

(10) Patent No.: US 9,483,718 B1
(45) Date of Patent: Nov. 1, 2016

(54) ENCODING AND DECODING DATA IN TWO-DIMENSIONAL SYMBOLOGY

(71) Applicant: International Business Machines Corporation, Armonk, NY (US)

(72) Inventors: Erich Guenter, Hofheim (DE); Mark E. Maresh, Wake Forest, NC (US); Colm Nolan, Meath (IE); Juan F. Vargas, Rochester, MN (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/967,461

(22) Filed: Dec. 14, 2015

(51) Int. Cl.
G06K 19/06 (2006.01)

(52) U.S. Cl.
CPC ... *G06K 19/06103* (2013.01); *G06K 19/06037* (2013.01)

(58) Field of Classification Search
CPC ............... G06K 19/06037; G06K 7/1491; G06K 1/121
USPC .............................. 235/462.09, 469, 494
See application file for complete search history.

(56) References Cited

U.S. PATENT DOCUMENTS

| | | | |
|---|---|---|---|
| 5,790,715 A | 8/1998 | Iizuka | |
| 7,025,269 B2* | 4/2006 | Marshall | G06K 1/121 235/462.01 |
| 8,113,432 B2* | 2/2012 | Kimura | G06K 1/123 235/469 |
| 8,662,396 B2* | 3/2014 | Berkun | G06K 7/14 235/454 |
| 8,794,537 B2* | 8/2014 | Guenter | G06K 19/06056 235/462.01 |
| 9,311,584 B2* | 4/2016 | Al-Omari | G06K 7/1417 |
| 2004/0026510 A1 | 2/2004 | Cheung et al. | |
| 2007/0125861 A1* | 6/2007 | Shoobridge | G06K 7/1434 235/462.04 |
| 2008/0018731 A1* | 1/2008 | Era | H04N 13/0033 348/51 |
| 2009/0312961 A1 | 12/2009 | Hovis et al. | |
| 2012/0048950 A1 | 3/2012 | Sato | |
| 2012/0126017 A1 | 5/2012 | Sharma et al. | |
| 2014/0339312 A1* | 11/2014 | Simske | G06K 19/06037 235/462.04 |

FOREIGN PATENT DOCUMENTS

| | | |
|---|---|---|
| WO | 9220033 | 11/1992 |
| WO | 2008000351 A2 | 1/2008 |
| WO | 2011049148 A1 | 4/2011 |

OTHER PUBLICATIONS

H. Malik, et al., "Steganalysis of QIM Steganography", IEEE Transactions on Multimedia, Jun. 2013, pp. 1-13.

* cited by examiner

*Primary Examiner* — Seung Lee
(74) *Attorney, Agent, or Firm* — Cantor Colburn LLP; Damion Josephs (57) ABSTRACT

Examples of techniques for encoding data in a 2D symbology are disclosed. In one example implementation according to aspects of the present disclosure, a computer-implemented method for encoding data in a 2D symbology is provided. The method includes assigning a first color representative of a 0-bit and a second color representative of a 1-bit. The method further includes designating a starting indicator and an ending indicator. The method also includes generating, by a processor, the 2D symbology, the 2D symbology includes a series of data segments and null segments representing a binary string. The series of data segments and null segments starts with the starting indicator and ends with the ending indicator. The data segments include 0-bit segments of the first color and 1-bit segments of the second color. The null segments are positioned between each of the data segments and are of a third color.

20 Claims, 7 Drawing Sheets

ENCODING AND DECODING DATA IN TWO-DIMENSIONAL SYMBOLOGY

BACKGROUND

The present disclosure relates to two-dimensional (2D) symbology, and more particularly, relates to techniques for encoding and decoding data in two-dimensional symbology.

A 2D symbology is a two-dimensional representation of information. A 2D symbology (e.g., Data Matrix codes) can be read by an imaging device (such as a camera, scanner, etc.) and information contained within the 2D symbology can be decoded. Some current 2D symbologies encode data that is readable and decodable by processing systems but most existing 2D symbologies are not able to convey useful information to a human without being decoded by the processing system. In addition, some current 2D symbologies have rigid spatial, size, orientation, and/or layout requirements, providing little flexibility in their presentation. Examples of some existing 2D symbologies include Data Matrix codes, Quick Response (QR) codes, Aztec codes, Semacodes, PDF417 codes, and various other matrix codes.

SUMMARY

In accordance with aspects of the present disclosure, a computer-implemented method for encoding data in a 2D symbology is provided. The method comprises assigning a first color representative of a 0-bit and a second color representative of a 1-bit. The method further comprises designating a starting indicator and an ending indicator. The method also comprises generating the 2D symbology, the 2D symbology comprising a series of data segments and null segments representing a binary string. The series of data segments and null segments starts with the starting indicator and ends with the ending indicator. The data segments comprise 0-bit segments of the first color and 1-bit segments of the second color. The null segments are positioned between each of the data segments and are of a third color.

In accordance with additional aspects of the present disclosure, a system for encoding data in a 2D symbology is provided. The system comprises a processor in communication with one or more types of memory. The processor is configured to assign a first color representative of a 0-bit and a second color representative of a 1-bit. The processor is further configured to designate a starting indicator and an ending indicator. The processor is also configured to generate the 2D symbology, the 2D symbology comprising a series of data segments and null segments representing a binary string. The series of data segments and null segments starts with the starting indicator and ends with the ending indicator. The data segments comprise 0-bit segments of the first color and 1-bit segments of the second color. The null segments are positioned between each of the data segments and are of a third color.

In accordance with yet additional aspects of the present disclosure, a computer program product for encoding data in a 2D symbology is provided. The computer program product comprises a non-transitory storage medium readable by a processing circuit and storing instructions for execution by the processing circuit for performing a method. The method comprises assigning a first color representative of a 0-bit and a second color representative of a 1-bit. The method further comprises designating a starting indicator and an ending indicator. The method also comprises generating, by a processor, the 2D symbology, the 2D symbology comprising a series of data segments and null segments representing a binary string. The series of data segments and null segments starts with the starting indicator and ends with the ending indicator. The data segments comprise 0-bit segments of the first color and 1-bit segments of the second color. The null segments are positioned between each of the data segments and are of a third color.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of encoding and decoding data in two-dimensional (2D) symbologies. To encode and decode data in a 2D symbology, the present techniques utilize a discrete number of line segments that can shape into a human-recognizable character, word, shape, or image. Each line segment is either a data segment or a null segment and is colored one of a first color, a second color, and a third color. The first color represents a 0-bit of a binary string and the second color represents a 1-bit of the binary string. Segments of the first and second color are data segments. The third color represents a null segment that does not represent a bit of the binary string and are used to separate the data bits from one another. The line segments are positioned end to end so as to form the 2D symbology, and the line segments alternate between data bits and null bits such that a null segment separates any two data bits.

In some implementations, the present techniques enable 2D symbology to be flexible in terms of spatial, size, orientation, and/or layout specifications. Moreover, the present techniques may enable a 2D symbology to be human-recognizable (e.g., text, a logo, a symbol, etc.). These and other advantages will be apparent from the description that follows.

Figure 1:
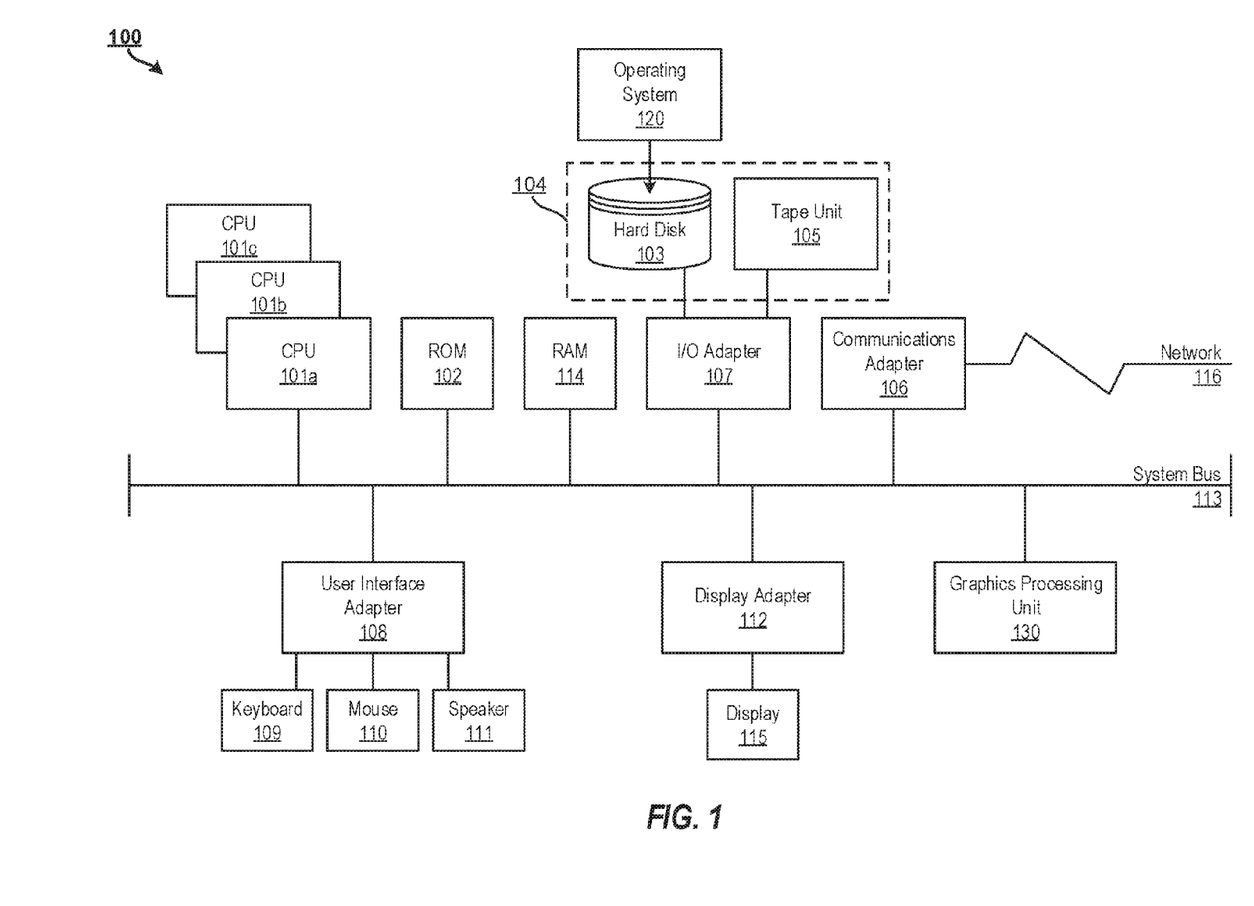
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
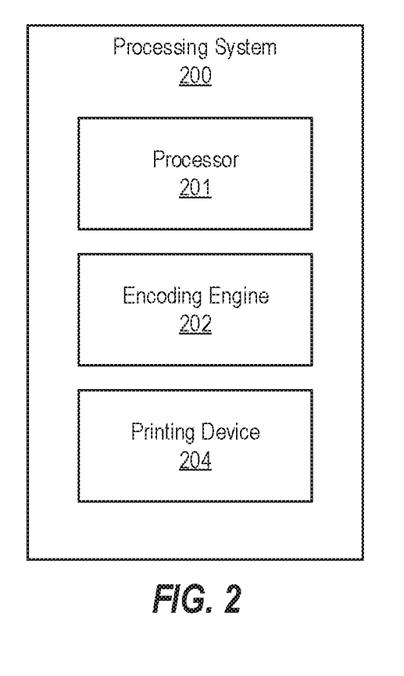
FIG. 2 illustrates a processing system for encoding data in two-dimensional symbology according to examples of the present disclosure.

FIG. 2 illustrates a processing system 200 for encoding data in two-dimensional symbology according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 200 may include a processor 201, an encoding engine 202, and a printing device 204. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Encoding engine 202 enables the processing system 200 to encode data into a 2D symbology by assigning a first color to represent a 0-bit and a second color to represent a 1-bit in a binary string. For example, the color "blue" may represent a 0-bit and the color "red" may represent a 1-bit. In other examples, alternative colors may be used instead. In further examples, two different shades of the same color may be used to represent the different bits. In aspects of the present disclosure, multiple colors may be used to represent additional bits (e.g., four colors for four bits, eight colors for eight bits, etc.).

Encoding engine 202 also designates a starting indicator and an ending indicator. The starting indicator may be comprised of a 1-bit data segment indicator being of a first color representing the 1-bit and a 0-bit data segment indicator being of a second color representing the 0-bit. In examples, the starting indicator may comprise a third segment as a null segment. However, in other examples, the starting indicator may comprise a symbol placed before the 1-bit data segment indicator, between the 1-bit data segment indicator and the 0-bit data segment indicator, and after the 0-bit data segment indicator. The ending indicator may comprise a 1-bit data segment indicator of the first color representing the 1-bit with a symbol before and after the 1-bit. In other examples, the ending indicator comprises a null segment without any symbols.

Printing device 204 prints the 2D symbology generated by encoding engine 202. For example printing device 204 may be a printer or other image creation device configured to print or otherwise display the 2D symbology. In examples, printing device 204 is a printer configured to print the 2D symbology on a physical medium such as paper. In other examples, printing device 204 is an electronic display configured to display the 2D symbology electronically.

Figure 3:
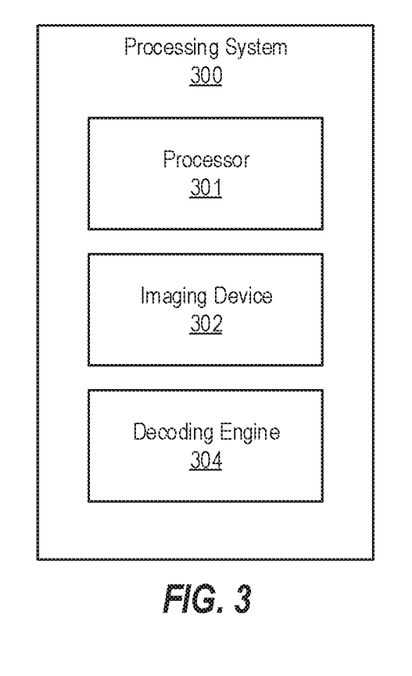
FIG. 3 illustrates a processing system for decoding data in two-dimensional symbology according to examples of the present disclosure.

FIG. 3 illustrates a processing system 300 for decoding data in two-dimensional symbology according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 300 may include a processor 301, an imaging device 302, and a decoding engine 304. Alternatively or additionally, the processing system 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Imaging device 302 captures an image of a 2D symbology. The 2D symbology comprises a series of data segments and null segments starting with a starting indicator and ending with an ending indicator. The data segments comprise 0-bit segments of a first color and 1-bit segments of a second color. The null segments are positioned between each of the data segments and are a third color. In examples, the imaging device 302 is a camera, scanner, or other device configured to capture an image, such as of a 2D symbology.

Decoding engine 304 recognizes the starting indicator and the ending indicator. The starting indicator defines a first color representative of a 0-bit and defines a second color representative of a 1-bit. The various examples of starting and ending indicators are disclosed herein.

Decoding engine 304 then extracts the binary string from the 2D symbology by reading each of the data segments and null segments between the starting indicator and the ending indicator. The data segments corresponding to a 0-bit are colored the first color and data segments corresponding to a 1-bit are colored the second color. In examples, once the starting indicator is recognized, the 2D symbology may be read by decoding engine 304. In particular, decoding engine 304 reads each of the data segments and null segments after the starting indicator until decoding engine 304 reaches the ending indicator.

Figure 4:
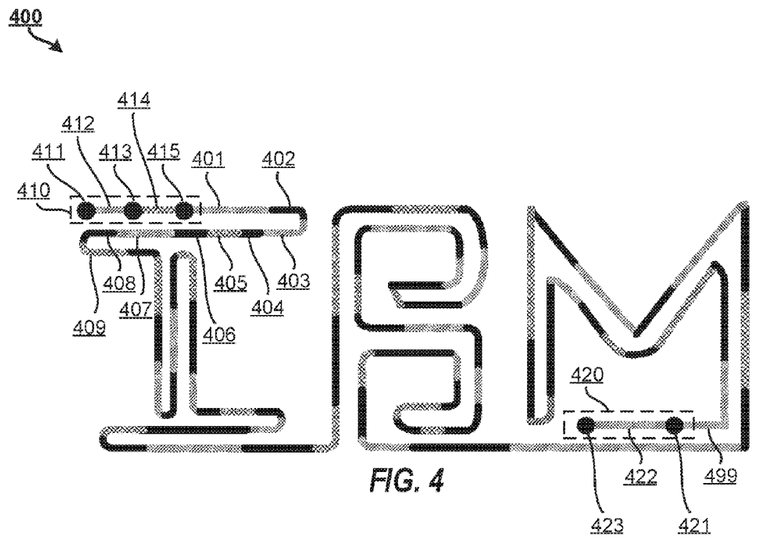
FIG. 4 illustrates a two-dimensional symbology according to examples of the present disclosure.

FIG. 4 illustrates a two-dimensional symbology 400 according to examples of the present disclosure. The 2D symbology 400 is formed by a continuous line with no breaks or overlaps (i.e., intersects). The continuous line may be of any length and/or shape, including straight portions and curved portions. The continuous line is formed by data segments and null segments, which are different colors representative of bits of a binary string. For example, data segments may represent 0-bits and 1-bits of the binary string. In one example, 0-bits may be represented by data segments colored red while 1-bits may be represented by data segments colored blue. In examples, each of the data segments and null segments may vary in length. However, in some examples, a minimum length may be implemented for each of the data segments and null segments to facilitate reading by the decoder. The continuous line formed by the data segments and null segments may be arranged in a human-recognizable layout, such as a letter, word, phrase, logo, image, symbol, and the like.

In examples, each of the data bits is separated by null bits, which may be a third color, such as green. For the binary string 1011 and using these example colors, the following series of segments may represent the binary string: a blue data segment (1-bit), a green data segment (null), a red data segment (0-bit), a green data segment (null), a blue data segment (1-bit), a green data segment (null), and a blue data segment (1-bit).

However, in another example according to aspects of the present disclosure, the null segment is used to separate two like data segments. For example, the null segment may be used to separate a 0-bit from an adjacent 0-bit or to separate a 1-bit from an adjacent 1-bit. In this example, the null segment is not used between two different bits (e.g., between a 0-bit and a 1-bit or between a 1-bit and a 0-bit). For the binary string 1011 and using these example colors, the following series of segments may represent the binary string: a blue data segment (1-bit), a red data segment (0-bit), a blue data segment (1-bit), a green data segment (null), and a blue data segment (1-bit).

In the example of FIG. 4, a starting indicator 410 comprises a first symbol 411, a 1-bit data segment indicator 412, a second symbol 413, a 0-bit data segment indicator 414, and a third symbol 415. In the present example, symbols 411, 413, 415 are solid circles on the line forming the 2D symbology 400, although other symbols could be used such as squares, triangles, and the like. Symbols 411, 413, 415 are of a color representing the null segment (e.g., the color green represents the null segment). The 1-bit data segment indicator 412 positioned between symbol 411 and symbol 413 defines the color of the data segments representing the 1-bit of the binary string (e.g., the color red represents a 1-bit). Similarly, 0-bit data segment indicator 414 positioned between symbol 413 and symbol 415 defines the color of the data segments representing the 0-bit of the binary string (e.g., the color blue represents a 0-bit).

Starting indicator 410 indicates the start of the 2D symbology 400. Each of the segments following starting indicator 410 represent bits of a binary string. In the present example of FIG. 4, segment 401 represents a 1-bit, segment 402 represents a null segment, segment 403 represents a 1-bit, segment 404 represents a null segment, segment 405 represents a 0-bit, segment 406 represents a null segment, segment 407 represents a 1-bit, segment 408 represents a null segment, segment 409 represents a 0-bit, and so on. Thus, in this example, segments 401-409 represent the string 11010. The segments continue through segment 499 (which represents a 1-bit), until an ending indicator 420 is reached. In examples, the first segment following starting indicator 410 is a data segment (not a null segment) and the last data segment before ending indicator 420 is a data segment (not a null segment). It should be appreciated that any suitable number of segments may be used to form the 2D symbology 400.

Ending indicator 420 comprises a first symbol 421, a 1-bit data segment indicator 422, and a second symbol 423. In the present example, symbols 421, 423 are solid circles on the line forming the 2D symbology 400, although other symbols could be used such as squares, triangles, and the like. Symbols 421, 423 are of a color representing the null segment (e.g., the color green represents the null segment). The 1-bit data segment indicator 422 positioned between symbol 421 and symbol 423 is of the same color as the 1-bit data segment indicator 412 of the starting indicator 410.

In examples according to aspects of the present disclosure, starting indicator 410 and ending indicator 420 may be designated by the color of the segments. For example, if a red segment represents a 1-bit, a blue segment represents a 0-bit, and a green segment represents a null segment, starting indicator 410 may be represented by a red data segment followed by a blue data segment followed by a green null segment. The segment following the null segment is then the first data segment (e.g., a red data segment representing a 1-bit or a blue data segment representing a 0-bit). In this example, ending indicator 420 is represented by a green null segment followed by a red data segment representing a 1-bit followed by a green null segment. The segment immediately preceding ending indicator 420 is a data segment (e.g., a red data segment representing a 1-bit or a blue data segment representing a 0-bit).

Figure 5:
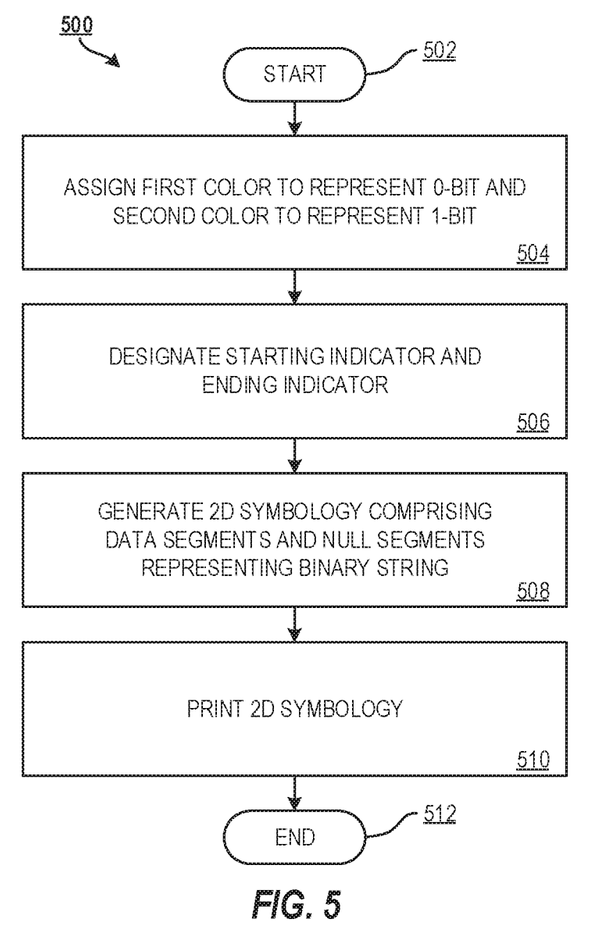
FIG. 5 illustrates a flow diagram of a method for encoding data in two-dimensional symbology according to examples of the present disclosure.

FIG. 5 illustrates a flow diagram of a method 500 for encoding data in two-dimensional symbology according to examples of the present disclosure. The method 500 begins at block 502 and continues to block 504.

At block 504, the method includes assigning a first color to represent a 0-bit and assigning a second color to represent a 1-bit.

At block 506, the method 500 includes designating a starting indicator and an ending indicator. The starting indicator may include a first symbol, a 1-bit data segment, a second symbol, a 0-bit data segment, and a third symbol. The first symbol, the second symbol, and the third symbol may be the same symbol. The ending indicator comprises a fourth symbol, a 1-bit data segment, and a fifth symbol. In examples, the first, second, third, fourth, and fifth symbols are the same symbol. Other configurations of starting indicators and ending indicators may be utilized.

At block 508, the method 500 includes generating the 2D symbology. The 2D symbology comprises a series of data segments and null segments, which start with the starting indicator and end with the ending indicator. The data segments comprise 0-bit segments and 1-bit segments. The 0-bit segments are colored the first color and the 1-bit segments are colored the second color. Each of the data segments are separate by a null segment (i.e., a null segment is positioned between each of the data segments) which is colored a third color. The first color, the second color, and the third color are different colors or different shades of the same color. The data segments and null segments may vary in length and shape. For example, some of the segments may be straight segments, while other segments may be curved segments. The segments need not be uniform in shape or length. In additional aspects of the present disclosure, the data segments and the null segments form a continuous line starting with the starting indicator and ending with the ending indicator. In examples, none of the data segments and the null segments intersect with any other of the data segments and the null segments. In this way, the data segments and null segments may form a human-recognizable layout, such as a letter, word, phrase, logo, image, symbol, or other human-recognizable layout.

At block 510, the method 500 includes printing the 2D symbology. In examples, printing the 2D symbology includes printing the 2D symbology with a printing device such that the 2D symbology is applied to an article (e.g., a piece of paper, a box, packaging materials, etc.). In other examples, printing the 2D symbology includes displaying the 2D symbology on a display device. The method 500 continues to block 512 and terminates.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
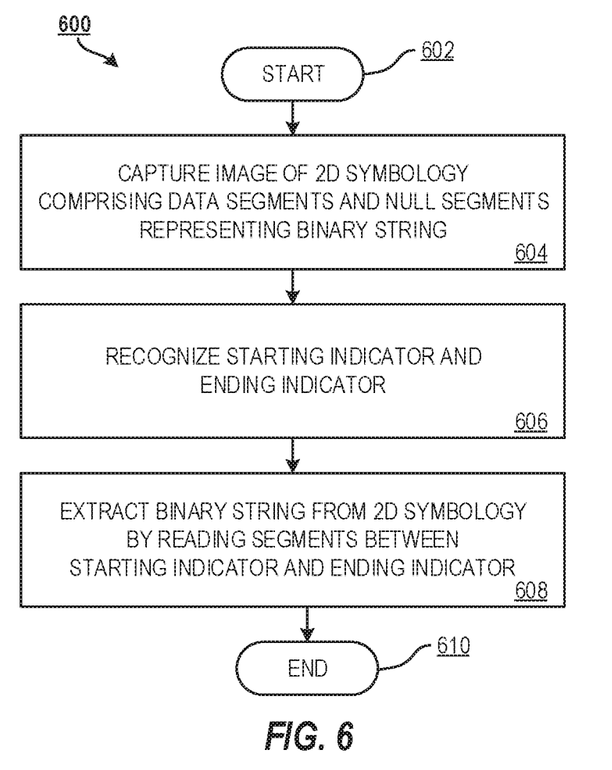
FIG. 6 illustrates a flow diagram of a method for decoding data in two-dimensional symbology according to examples of the present disclosure.

FIG. 6 illustrates a flow diagram of a method 600 for decoding data in two-dimensional symbology according to examples of the present disclosure. The method 600 begins at block 602 and continues to block 604.

At block 604, the method 600 includes capturing an image of a 2D symbology. The 2D symbology comprises a series of data segments and null segments starting with a starting indicator and ending with an ending indicator. The data segments comprising 0-bit segments that are colored a first color and 1-bit segments that are colored a second color. Each of the data segments are separate by a null segment (i.e., a null segment is positioned between each of the data segments) which is colored a third color. The first color, the second color, and the third color are different colors or different shades of the same color.

At block 606, the method 600 includes recognizing the starting indicator and the ending indicator. Various configurations of starting indicators and ending indicators may be utilized as described herein.

At block 608, the method 600 includes extracting the binary string from the 2D symbology by reading each of the data segments and null segments between the starting indicator and the ending indicator. Data segments corresponding to a 0-bit are colored the first color and data segments corresponding to a 1-bit are colored the second color. The method 600 continues to block 610 and terminates.

Additional processes also may be included, and it should be understood that the processes depicted in FIG. 6 represent illustrations, and that other processes may be added or existing processes may be removed, modified, or rearranged without departing from the scope and spirit of the present disclosure.

It should be appreciated that, although the present disclosure describes the data segments and null segments in terms of colors, other indicia may be utilized to distinguish the segments. For example, the segments may vary in line weight with a light line weight segment representing a 0-bit, a heavy line weight segment representing a 1-bit, and a medium line weight segment representing a null segment. In other examples, hashing or patterns may be utilized to distinguish the data segments and null segments. For example, as illustrated in FIG. 4, a segment with a slanted hashing (e.g., segment 401) may represent a 1-bit, a segment with cross hatching (e.g., segment 405) may represent a 0-bit, and a solid segment (e.g., segment 402) may represent a null segment. Other suitable indicia, such as dashed segments, may also be implemented.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
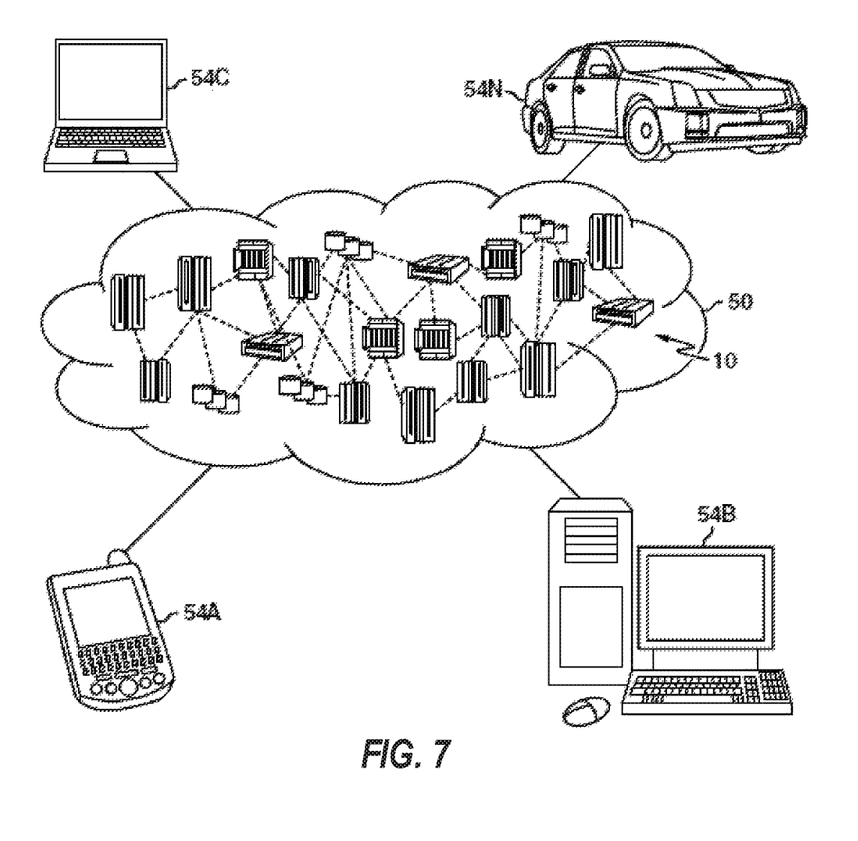
FIG. 7 illustrates a cloud computing environment according to examples of the present disclosure.

Referring now to FIG. 7, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
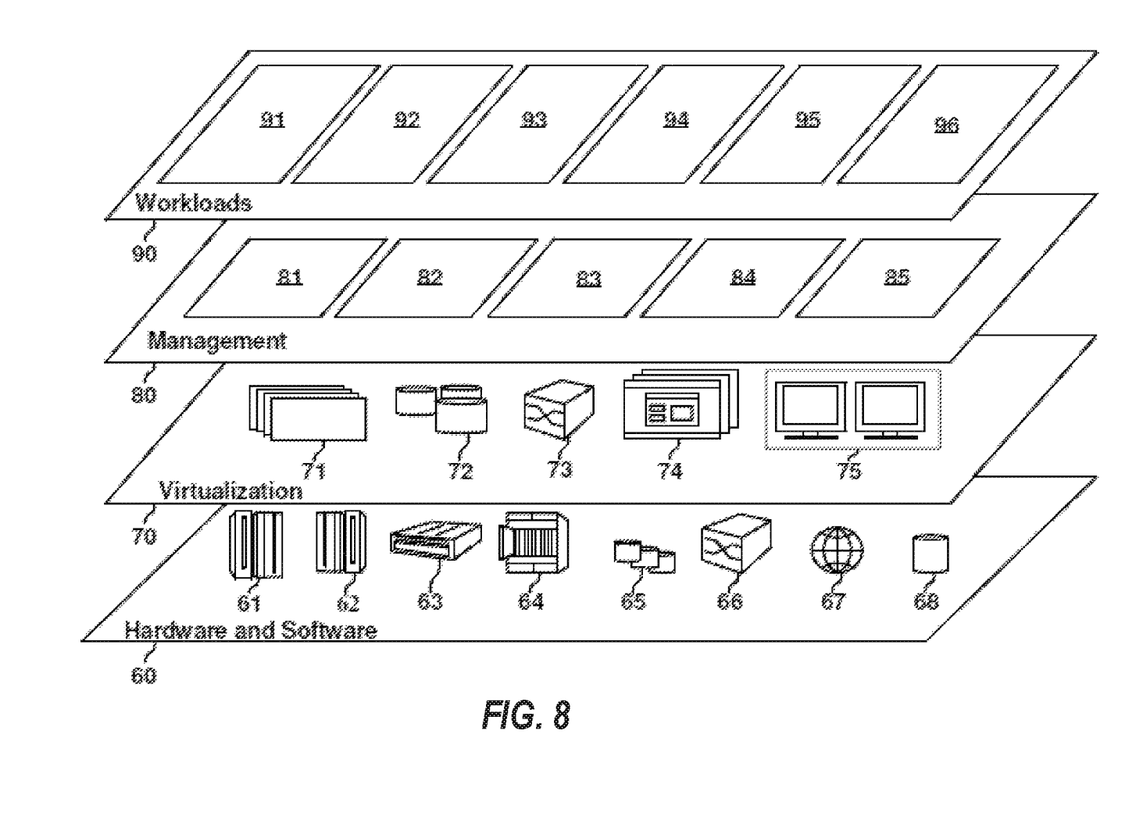
FIG. 8 illustrates abstraction model layers according to examples of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage of applications for mobile devices 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for encoding data in a two-dimensional (2D) symbology, the method comprising:
   assigning a first color representative of a 0-bit and a second color representative of a 1-bit;
   designating a starting indicator and an ending indicator; and
   generating, by a processor, the 2D symbology, the 2D symbology comprising a series of data segments and null segments representing a binary string, wherein the series of data segments and null segments starts with the starting indicator and ends with the ending indicator, wherein the data segments comprise 0-bit segments of the first color and 1-bit segments of the second color, and wherein the null segments are positioned between each of the data segments and are of a third color.

2. The computer-implemented method of claim 1, wherein the starting indicator comprises a first symbol, a 1-bit data segment indicator, a second symbol, a 0-bit data segment indicator, and a third symbol.

3. The computer-implemented method of claim 2, wherein the ending indicator comprises a fourth symbol, a 1-bit data segment indicator, and a fifth symbol.

4. The computer-implemented method of claim 3, wherein the first symbol, the second symbol, the third symbol, the fourth symbol, and the fifth symbol are the same symbol.

5. The computer-implemented method of claim 1, further comprising printing the 2D symbology.

6. The computer-implemented method of claim 1, wherein the data segments and the null segments vary in length and shape.

7. The computer-implemented method of claim 1, wherein the data segments and the null segments form a continuous line starting with the starting indicator and ending with the ending indicator, and wherein none of the data segments and the null segments intersect with any other of the data segments and the null segments.

8. The computer-implemented method of claim 7, wherein the data segments and null segments form a human-recognizable layout.

9. A system for encoding data in a two-dimensional (2D) symbology, the system comprising:
   a processor in communication with one or more types of memory, the processor configured to:
   assign a first color representative of a 0-bit and a second color representative of a 1-bit,
   designate a starting indicator and an ending indicator, and
   generate the 2D symbology, the 2D symbology comprising a series of data segments and null segments representing a binary string, wherein the series of data segments and null segments starts with the starting indicator and ends with the ending indicator, wherein the data segments comprise 0-bit segments of the first color and 1-bit segments of the second color, and wherein the null segments are positioned between each of the data segments and are of a third color.

10. The system of claim 9, wherein the starting indicator comprises a first symbol, a 1-bit data segment indicator, a second symbol, a 0-bit data segment indicator, and a third symbol.

11. The system of claim 10, wherein the ending indicator comprises a fourth symbol, a 1-bit data segment indicator, and a fifth symbol.

12. The system of claim 11, wherein the first symbol, the second symbol, the third symbol, the fourth symbol, and the fifth symbol are the same symbol.

13. The system of claim 9, wherein the processor is further configured to print the 2D symbology.

14. The system of claim 9, wherein the data segments and the null segments vary in length and shape.

15. The system of claim 9, wherein the data segments and the null segments form a continuous line starting with the starting indicator and ending with the ending indicator, and wherein none of the data segments and the null segments intersect with any other of the data segments and the null segments.

16. The system of claim 15, wherein the data segments and null segments form a human-recognizable layout.

17. A computer program product for encoding data in a two-dimensional (2D) symbology, the computer program product comprising:
   a non-transitory storage medium readable by a processing circuit and storing instructions for execution by the processing circuit for performing a method comprising:
   assigning a first color representative of a 0-bit and a second color representative of a 1-bit,
   designating a starting indicator and an ending indicator, and
   generating the 2D symbology, the 2D symbology comprising a series of data segments and null segments representing a binary string, wherein the series of data segments and null segments starts with the starting indicator and ends with the ending indicator, wherein the data segments comprise 0-bit segments of the first color and 1-bit segments of the second color, and wherein the null segments are positioned between each of the data segments and are of a third color.

18. The computer program product of claim 17, wherein the starting indicator comprises a first symbol, a 1-bit data segment indicator, a second symbol, a 0-bit data segment indicator, and a third symbol, wherein the ending indicator comprises a fourth symbol, a 1-bit data segment indicator, and a fifth symbol, and wherein the first symbol, the second symbol, the third symbol, the fourth symbol, and the fifth symbol are the same symbol.

19. The computer program product of claim 17, wherein the method further comprises printing the 2D symbology.

20. The computer program product of claim 17, wherein the data segments and the null segments form a continuous line starting with the starting indicator and ending with the ending indicator, wherein none of the data segments and the null segments intersect with any other of the data segments and the null segments, and wherein the data segments and null segments form a human-recognizable layout.

* * * * *